United States Patent
Zhao

(10) Patent No.: US 12,289,318 B2
(45) Date of Patent: Apr. 29, 2025

(54) METHOD AND APPARATUS FOR INPUTTING VERIFICATION INFORMATION, AND STORAGE MEDIUM

(71) Applicant: Beijing Xiaomi Mobile Software Co., Ltd., Beijing (CN)

(72) Inventor: Linger Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 182 days.

(21) Appl. No.: 17/957,544

(22) Filed: Sep. 30, 2022

(65) Prior Publication Data

US 2023/0139486 A1 May 4, 2023

(30) Foreign Application Priority Data

Oct. 29, 2021 (CN) .......................... 202111276424.7

(51) Int. Cl.
*H04L 29/06* (2006.01)
*H04L 9/40* (2022.01)

(52) U.S. Cl.
CPC ............ *H04L 63/12* (2013.01); *H04L 63/102* (2013.01); *H04L 63/20* (2013.01)

(58) Field of Classification Search
CPC ....... H04L 63/12; H04L 63/102; H04L 63/20; H04L 9/3228; H04L 63/0838; H04L 9/0863
See application file for complete search history.

(56) References Cited

U.S. PATENT DOCUMENTS

| | | | |
|---|---|---|---|
| 2013/0333006 A1* | 12/2013 | Tapling | H04L 9/3234 726/5 |
| 2015/0302215 A1 | 10/2015 | Hu | |
| 2016/0191504 A1* | 6/2016 | Kim | H04W 12/06 726/6 |
| 2016/0197914 A1* | 7/2016 | Oberheide | H04L 63/0853 713/183 |
| 2021/0218725 A1 | 7/2021 | Fang et al. | |
| 2022/0060872 A1* | 2/2022 | Liu | H04W 76/10 |
| 2022/0124100 A1 | 4/2022 | Yang | |

(Continued)

FOREIGN PATENT DOCUMENTS

| | | | |
|---|---|---|---|
| CN | 104618315 A | 5/2015 | |
| CN | 106130998 A | 11/2016 | |

(Continued)

*Primary Examiner* — Yogesh Paliwal
(74) *Attorney, Agent, or Firm* — Volpe Koenig

(57) ABSTRACT

A method and apparatus for inputting verification information, and a storage medium. The method is performed by a first terminal, and includes: sending, in response to a verification information request operation triggered by a user, a verification information request message to a verification server, where the verification information request message includes user communication identifier information, such that the verification server may generate verification information according to the verification information request message, and send the verification information to a second terminal corresponding to the user communication identifier information; receiving the verification information synchronized with the second terminal; and inputting the verification information into a displayed verification information input page.

17 Claims, 17 Drawing Sheets

(56) References Cited

U.S. PATENT DOCUMENTS

2022/0303260 A1     9/2022   Yao
2023/0112507 A1*   4/2023   Petersen ................. H04L 63/10
                                                                         713/186

FOREIGN PATENT DOCUMENTS

| CN | 106209763 A | 12/2016 |
| CN | 110336720 A | 10/2019 |
| CN | 110392054 A | 10/2019 |
| CN | 113452760 A | 9/2021 |
| WO | 2015/101019 A1 | 7/2015 |
| WO | 2016061769 A1 | 4/2016 |
| WO | 2020206899 A1 | 10/2020 |
| WO | 2021/000808 A1 | 1/2021 |

* cited by examiner

METHOD AND APPARATUS FOR INPUTTING VERIFICATION INFORMATION, AND STORAGE MEDIUM

CROSS REFERENCE TO RELATED APPLICATIONS

The present application claims the benefit of priority to Chinese Application No. 202111276424.7, filed on Oct. 29, 2021, the entire contents of which are incorporated herein by reference in their entireties for all purposes.

BACKGROUND

With the development of Internet technology, more and more intelligent terminal devices enter people's lives. In order to ensure the security of information interaction, SMS verification is required when logging in to or registering at all kinds of applications, and users can continue to use corresponding functions only after inputting correct verification information.

SUMMARY

The disclosure provides a method and apparatus for inputting verification information, and a storage medium.

According to a first aspect of examples of the disclosure, a method for inputting verification information is provided. The method is performed by a first terminal, and includes: sending, in response to a verification information request operation triggered by a user, a verification information request message to a verification server, where the verification information request message includes user communication identifier information, such that the verification server may generate verification information according to the verification information request message, and send the verification information to a second terminal corresponding to the user communication identifier information; receiving the verification information synchronized with the second terminal; and inputting the verification information into a displayed verification information input page.

According to a second aspect of examples of the disclosure, a method for inputting verification information is provided. The method is performed by a second terminal, and includes: receiving verification information sent by a verification server, the verification information being generated by the verification server according to a verification information request message; and synchronizing the verification information to a first terminal, such that the first terminal inputs the verification information into a displayed verification information input page.

According to a third aspect of examples of the disclosure, an apparatus for inputting verification information is provided. The apparatus is applied to a first terminal, and includes: a processor; and a memory configured to store processor-executable instructions. The processor is configured to: send, in response to a verification information request operation triggered by a user, a verification information request message to a verification server, where the verification information request message includes user communication identifier information, such that the verification server may generate the verification information according to the verification information request message, and send the verification information to a second terminal corresponding to the user communication identifier information; receive the verification information synchronized with the second terminal; and input the verification information into a displayed verification information input page.

According to a fourth aspect of examples of the disclosure, an apparatus for inputting verification information is provided. The apparatus is applied to a second terminal, and includes: a processor; and a memory configured to store processor-executable instructions. The processor is configured to: receive verification information sent by a verification server, the verification information being generated by the verification server according to a verification information request message; and synchronize the verification information to a first terminal, such that the first terminal inputs the verification information into a displayed verification information input page.

According to a fifth aspect of examples of the disclosure, a non-transitory computer-readable storage medium is provided. Computer program instructions are stored on the computer-readable storage medium. The program instructions, when executed by a processor, implement the steps of the method for inputting verification information provided in the first aspect of the disclosure.

According to a sixth aspect of examples of the disclosure, a non-transitory computer-readable storage medium is provided. Computer program instructions are stored on the computer-readable storage medium. The program instructions, when executed by a processor, implement the steps of the method for inputting verification information provided in the second aspect of the disclosure.

It is to be understood that the above general descriptions and later detailed descriptions are merely examples and illustrations and cannot limit the disclosure.

BRIEF DESCRIPTION OF THE DRAWINGS

The accompanying drawings, which are incorporated in and constitute a part of the specification, illustrate examples consistent with the disclosure and together with the specification serve to explain the principles of the disclosure.

DETAILED DESCRIPTION

Figure 1:
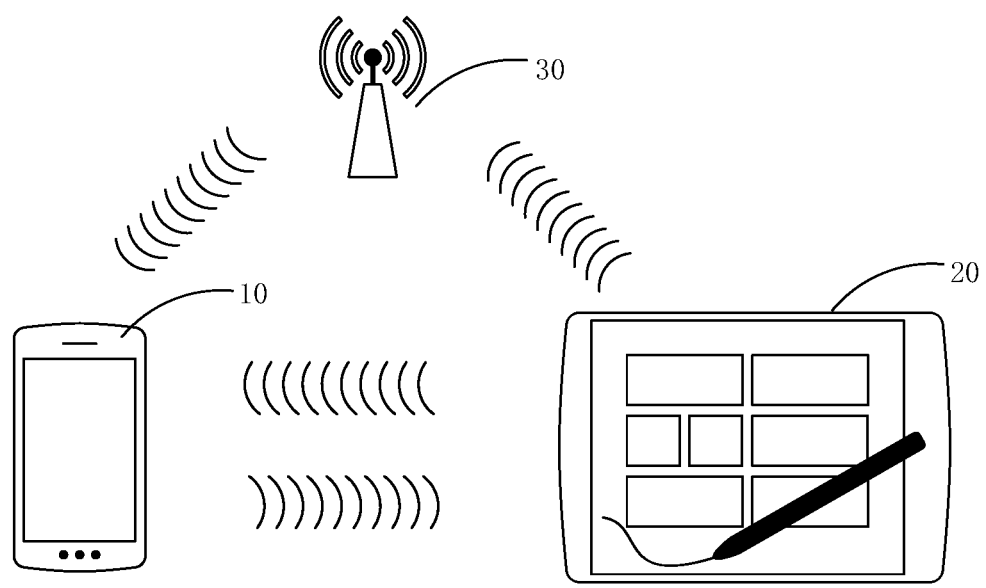
FIG. 1 is a schematic diagram of an application scenario according to an example.

Examples will be described in detail here, instances of which are illustrated in the accompanying drawings. When the following description refers to the accompanying drawings, unless otherwise indicated, the same numbers in different accompanying drawings indicate the same or similar elements. The implementations described in the following examples do not represent all implementations consistent with the disclosure. Rather, they are merely instances of apparatuses and methods consistent with some aspects of the disclosure as detailed in the appended claims.

The disclosure relates to the technical field of information interaction, in particular to a method and apparatus for inputting verification information, and a storage medium.

With the development of Internet technology, more and more intelligent terminal devices enter people's lives. In order to ensure the security of information interaction, SMS verification is required when logging in to or registering at all kinds of applications, and users can continue to use corresponding functions only after inputting correct verification information.

At present, interaction of verification code information between two terminal devices still relies on manual input. Taking a mobile phone and a tablet PC as an example, when an application on the tablet PC needs to be verified by a mobile phone code, a user needs to manually input an SMS verification code received by the mobile phone on the tablet PC, which has poor portability and affects user experience.

Prior to introducing a method and apparatus for inputting verification information, and a storage medium provided by the disclosure, an application scenario involved in the examples of the disclosure is first introduced. The disclosure is performed by a scenario of information interaction between two terminal devices. The application scenario may include a first terminal, a second terminal, and a verification server, and information interaction may be performed among the first terminal, the second terminal, and the verification server. The first terminal sends, in response to a verification information request operation triggered by a user, a verification information request message to the verification server, and sends a verification information obtaining message to the second terminal. The verification information request message includes user communication identifier information. The verification server generates verification information according to the verification information request message, and sends the verification information to the second terminal corresponding to the user communication identifier information. The second terminal synchronizes the verification information to the first terminal in the case of receiving the verification information obtaining message sent by the first terminal. The first terminal inputs the verification information into a displayed verification information input page after receiving the verification information synchronized with the second terminal.

For example, FIG. 1 is a schematic diagram of an application scenario according to an example. As shown in FIG. 1, the above first terminal may be a mobile phone 10, and the second terminal may be a tablet computer 20. After receiving the verification information request operation triggered by the user, the mobile phone sends the verification information request message to the verification server 30, and sends the verification information obtaining message to the second terminal 20. The verification server 30 generates the verification information according to the verification information request message, and sends the verification information to the mobile phone 10 corresponding to the user communication identifier information. The mobile phone 10 synchronizes the verification information to the tablet computer 20 in the case of receiving the verification information obtaining message sent by the tablet computer 20.

The disclosure will be described below with reference to specific examples.

Figure 2:
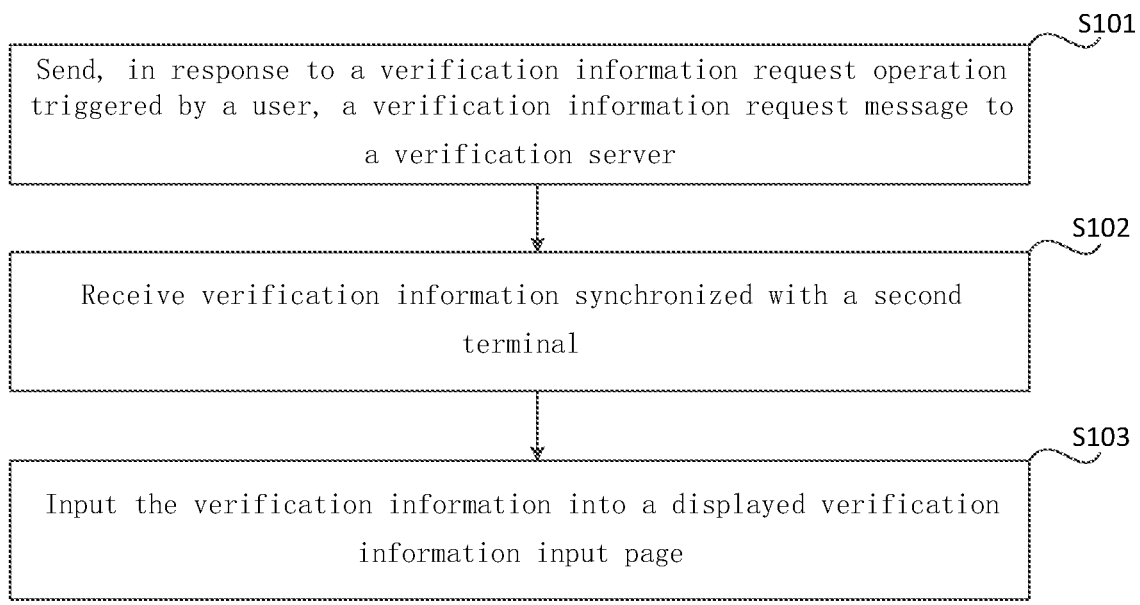
FIG. 2 is a flowchart of a method for inputting verification information according to an example.

FIG. 2 is a flowchart of a method for inputting verification information according to an example. As shown in FIG. 2, the method is performed by a first terminal, and includes the following steps:

In step S101, in response to a verification information request operation triggered by a user, a verification information request message is sent to a verification server.

The verification information request message includes user communication identifier information, such that the verification server may generate verification information according to the verification information request message, and send the verification information to a second terminal corresponding to the user communication identifier information.

In the example of the disclosure, the verification information request operation triggered by the user may be an operation that the user clicks on a verification information sending request region in a current display interface of the first terminal, or an operation of triggering the verification information request operation by voice recognition, or other operations, which is not specifically limited in the disclosure.

The first terminal and the second terminal may be any terminal device that may send and receive verification information, such as a smart phone, a tablet computer, a smart TV, a personal digital assistant (PDA), a projector, a portable computer and other mobile terminals, and may also be fixed terminals such as a desktop computer.

In step S102, the verification information synchronized with the second terminal is received.

The verification information may be verification code information containing a plurality of digits, or may be verification code information containing both a plurality of letters and a plurality of digits, and the letters may be uppercase letters or lowercase letters, which is not specifically limited in the disclosure.

For example, the verification information may be six-digit verification code information "165849" containing numbers, or six-digit verification code information "Qb5F9v" containing uppercase letters, lowercase letters and numbers.

In step S103, the verification information is input into a displayed verification information input page.

In this step, it may be first determined whether the verification information input page is displayed on the current interface or not, and in the case of determining that the verification information input page is displayed on the current page, the verification information is input into the displayed verification information input page.

In the example of the disclosure, before inputting the verification information into the displayed verification information input page, whether the verification information input page is displayed on the current interface requires to be determined, and in the case of determining that the verification information input page is displayed on the current page, the verification information is input into the verification information input page of the first terminal. In the case of determining that the verification information input page is not displayed on the current page, it may be determined that the user does not require to further input the verification information, and in this case, the verification information is not displayed.

With the above method, the first terminal inputs the verification information into the displayed verification information input page after receiving the verification information synchronized with the second terminal, so that the intelligence and convenience of verification information input are improved, the user does not need to manually input the verification information, and the user experience is improved.

Figure 3:
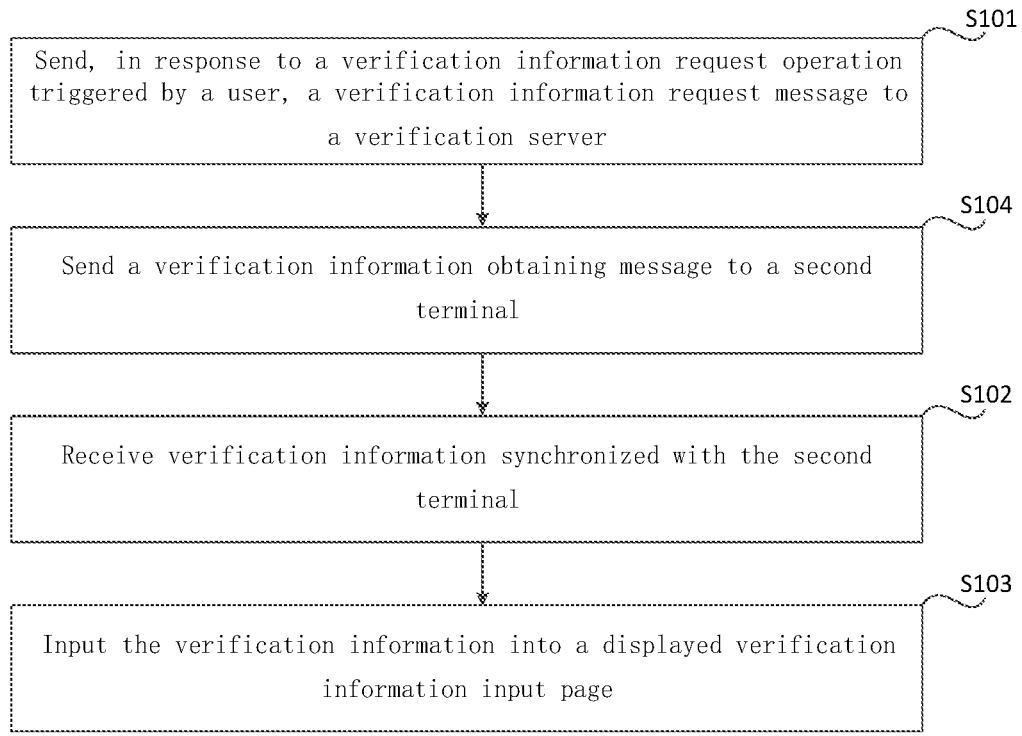
FIG. 3 is a flowchart of another method for inputting verification information according to an example.

FIG. 3 is a flowchart of another method for inputting verification information according to an example. As shown in FIG. 3, before step S102, the method further includes the following step:

Step S104, a verification information obtaining message is sent to the second terminal.

The verification information obtaining message is used to send an obtaining request to the second terminal, so that the second terminal may synchronize the verification information to the first terminal according to the verification information obtaining message.

Correspondingly, receiving the verification information synchronized with the second terminal includes:

the verification information synchronized with the second terminal in response to the verification information obtaining message is received.

The verification information obtaining message may be a message including device information of the first terminal. In addition, in the case that the second terminal is connected to a plurality of terminal devices, the second terminal can also accurately determine a terminal device that needs to receive the verification information according to the verification information obtaining message sent by the first terminal, so that the verification information can be accurately sent to the first terminal.

In the example of the disclosure, before sending the verification information obtaining message to the second terminal, the first terminal may further determine a demand of the user for obtaining the verification information according to whether the verification information input page is displayed on the current interface. In the case that the verification information input page is displayed on the current interface, the first terminal sends the verification information obtaining message to the second terminal. Correspondingly, in the case of determining that the verification information input page is not displayed on the current page, it may be determined that the user has no further request for inputting the verification information, and in this case, the first terminal may not send the verification information obtaining message to the second terminal. In this way, the user can be effectively prevented from triggering the verification information request operation due to a misoperation. However, the user exits the verification information input page in time after discovering the misoperation, which indicates that the user has no further request for inputting the verification information. In this way, poor user experience caused by sending the verification information in this case can be avoided.

In addition, the verification information input page and the verification information sending request region may be or may not be located on the same display interface. For example, in the case that the verification information input page and the verification information sending request region are not located on the same display interface, after the user triggers the verification information request operation, the verification information input page may pop up on a display interface of the first terminal, so that the user may input the verification information into the verification information input page. The disclosure is not limited to the above two manners of displaying the verification information input page, and may further include other display manners, which are not specifically limited.

Figure 4:
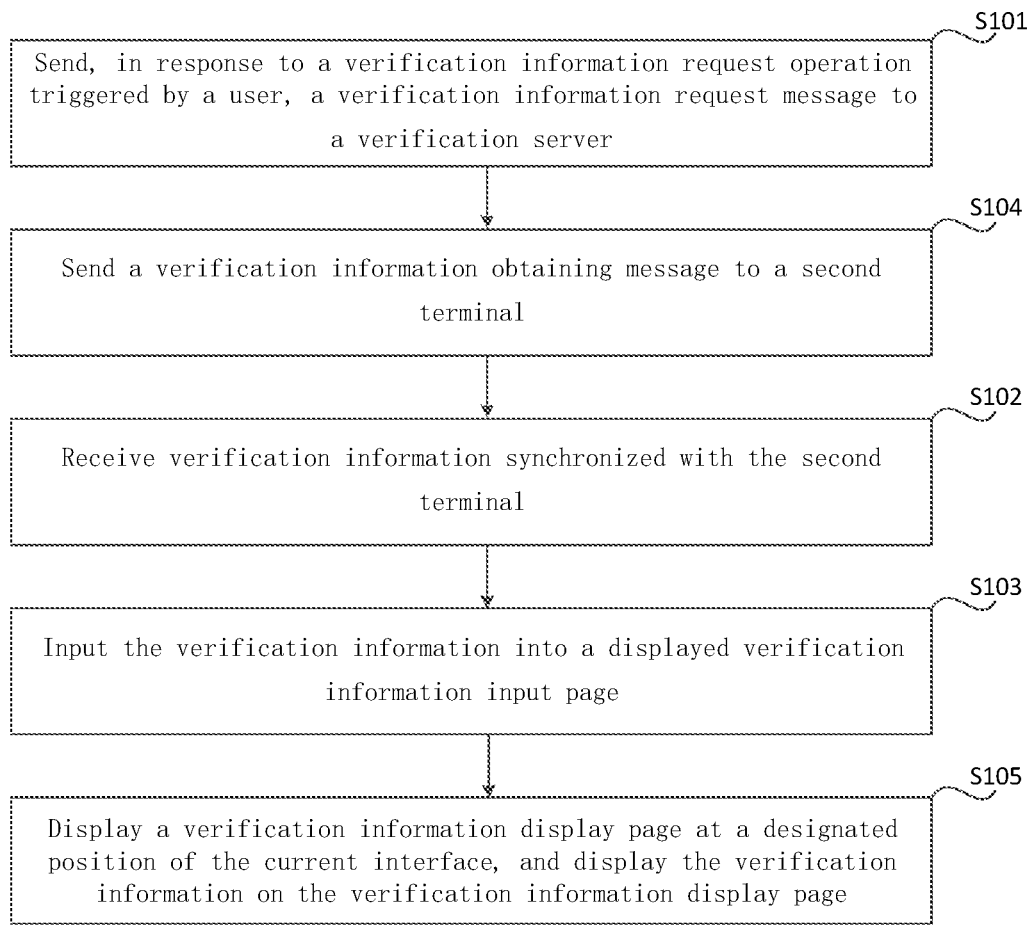
FIG. 4 is a flowchart of yet another method for inputting verification information according to an example.

FIG. 4 is a flowchart of yet another method for inputting verification information according to an example. As shown in FIG. 4, after step S103, the method further includes the following step:

In step S105, a verification information display page is displayed at a designated position of the current interface, and the verification information is displayed on the verification information display page.

The specified position may be any position on the current interface of the first terminal. For example, the specified position may be regions such as the upper left, top, upper right, lower left, bottom, and lower right of the verification information input page. The verification information display page may be a display page in any shape, for example, a bubble-shaped display page or a cloud-shaped display page, which is not specifically limited in the disclosure.

Figure 5:
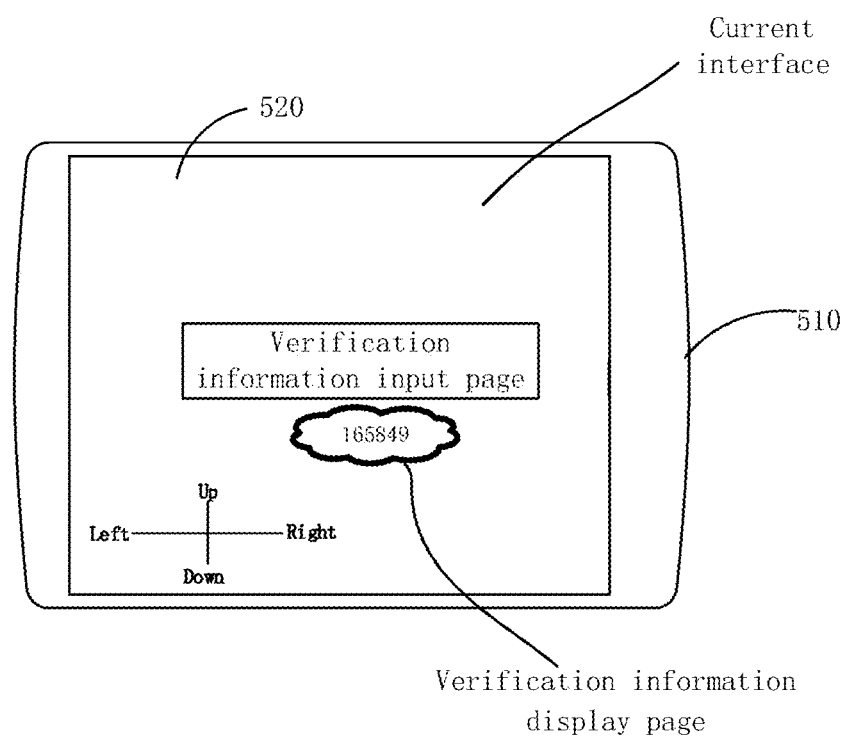
FIG. 5 is a schematic diagram of a verification information display page according to an example.

Taking the first terminal 510 being a tablet computer and the verification information being "165849" as an example for description, as shown in FIG. 5, the verification information display page 520 is a cloud-shaped display page, and the cloud-shaped display page carries the verification information "165849". After receiving the verification information sent by the second terminal, the first terminal displays the verification information at the bottom of the verification information input page in the current interface in the form of the cloud-shaped display page.

Correspondingly, inputting the verification information into the displayed verification information input page includes:

in the case that the displayed verification information meets a preset input condition, the verification information is input into the verification information input page.

The verification information input page may be a verification information input box, that is, the verification information is directly input into the verification information input box. The verification information input page may also be a plurality of verification information input boxes. In this cases, the verification information requires to be split into a plurality of pieces of verification information, and then the plurality of pieces of verification information are input into the corresponding verification information input boxes respectively. For a specific splitting method, reference may be made to related splitting methods in the prior art, which will not be repeated here. In the similar way, other input methods for the verification information input page may also be used, which is not specifically limited in the disclosure.

Figure 6A:
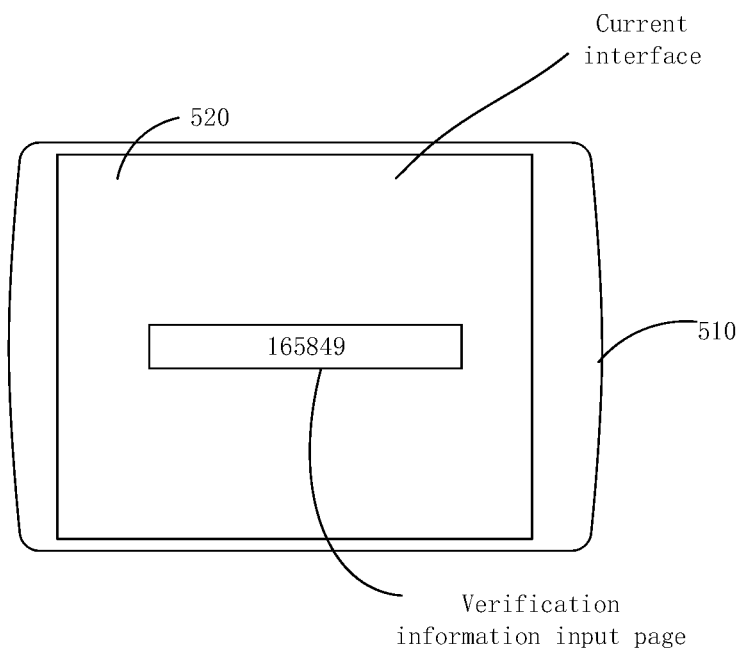
FIG. 6A is a schematic diagram of a manner of displaying verification information according to an example.
Figure 6B:
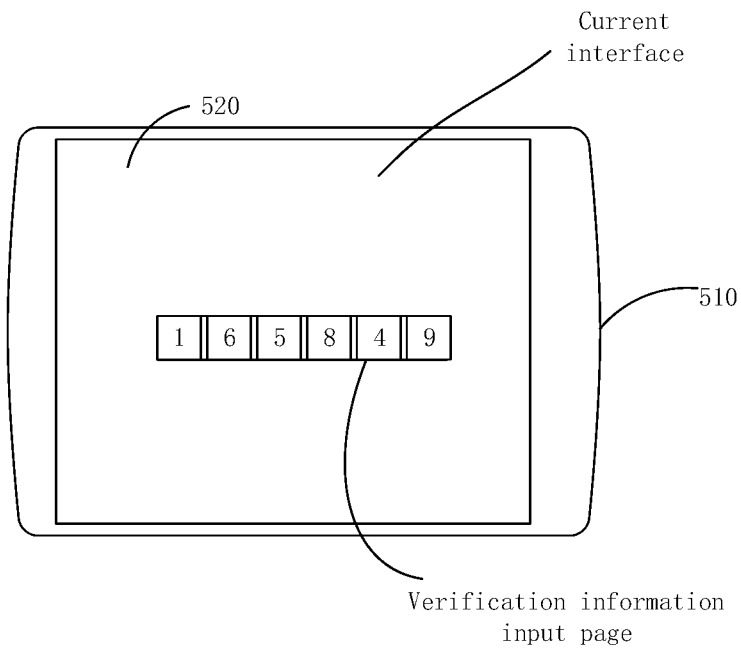
FIG. 6B is a schematic diagram of another manner of displaying verification information according to an example.

For the convenience of description, continue to take the first terminal being the tablet computer and the verification code information being "165849" as an example for description. In the case where the verification information input page 520 on the current interface of the tablet computer is a verification information input box, as shown in FIG. 6A, "165849" is directly input into the verification information input box. In the case that the verification information input page 520 is six verification information input boxes, as shown in FIG. 6B, "165849" is first split into "1", "6", "5", "8", "4" and "9", and then the six pieces of split verification information are input into the corresponding verification information input boxes respectively.

For example, in the example of the disclosure, the preset input conditions may include the following two:

Condition 1: an information input operation of the user on the displayed verification information is obtained within a preset time period; and Condition 2: the information input operation of the user on the displayed verification information is not obtained in the case that the preset time period is reached.

For example, the information input operation of the user on the displayed verification information may be an operation of the user clicking on the verification information display page in the current interface of the first terminal. The preset time period may be set according to the configuration of different terminal devices. In the case that the information input operation of the user on the displayed verification information is obtained within the preset time period, the verification information is input into the verification information input page. In order to solve the problem that the user may not be able to perform the information input operation on the displayed verification information in time due to some reasons at this time, if the information input operation of the user on the displayed verification information is not obtained in the case that the preset time period is reached, the verification information may be input into the verification information input page.

Figure 7:
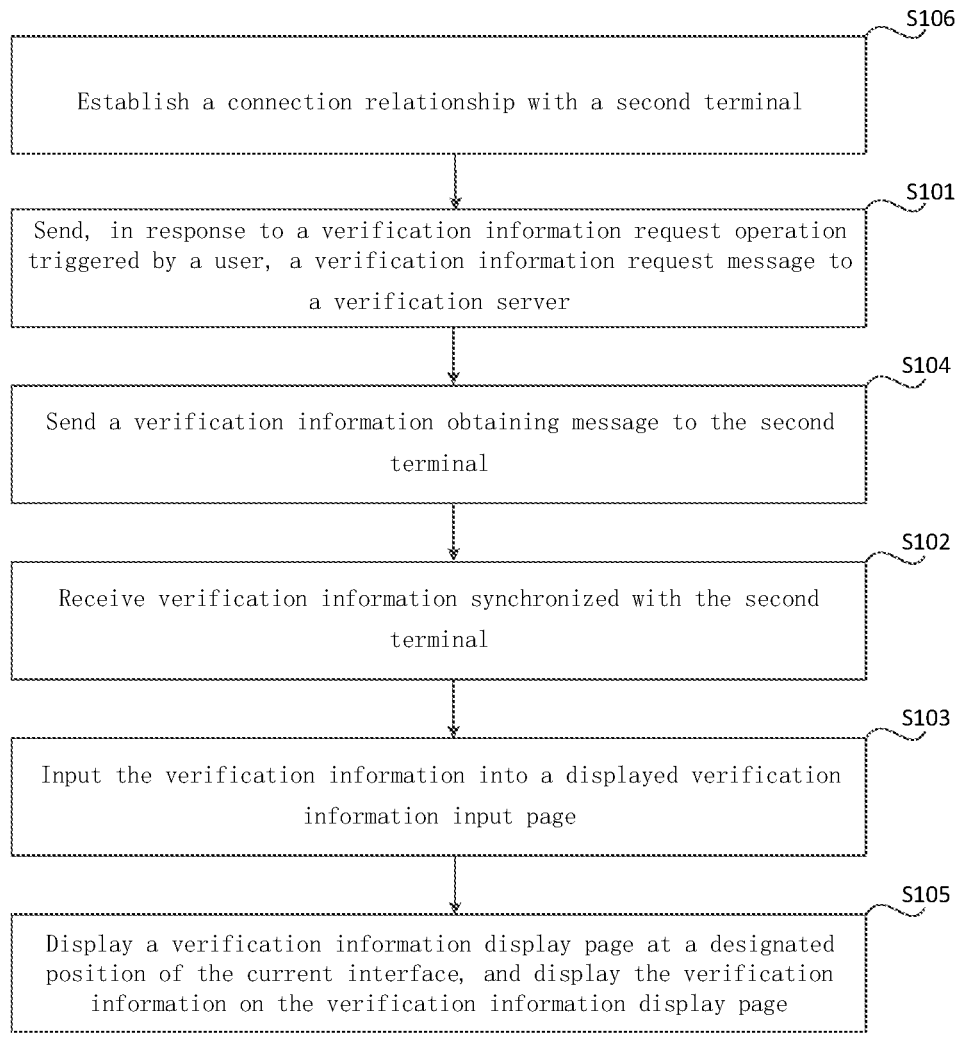
FIG. 7 is a flowchart of yet another method for inputting verification information according to an example.

FIG. 7 is a flowchart of yet another method for inputting verification information according to an example. As shown in FIG. 7, before step S101, the method further includes the following step:

In Step S106, a connection relationship with the second terminal is established.

Correspondingly, receiving the verification information synchronized with the second terminal may include:

in the case that the connection with the second terminal is established, the verification information synchronized with the second terminal is received.

For example, the connection relationship with the second terminal may be established in the following manners:

in the case that the second terminal logs in to the same user account as the first terminal, the connection relationship with the second terminal is established; or, a connection establishment request message sent by the second terminal is received, and the connection relationship with the second terminal is established according to the connection establishment request message.

The first terminal and the second terminal log in to the same user account, and the user account may be the same device account or the same application account.

For example, the connection establishment request message may be a request message initiated by the second terminal to the first terminal, and the first terminal needs to input the verification information provided by the second terminal side. The verification information may be a multi-digit number. After the first terminal inputs the verification information, the first terminal establishes the connection relationship with the second terminal. The connection establishment request message may also be that the second terminal scans a connection two-dimensional code of the first terminal side, so that the connection relationship between the first terminal and the second terminal is established.

The connection establishment request message may realize communication via a wireless-fidelity (Wi-Fi) protocol, a Bluetooth protocol, etc., which is not specifically limited in the disclosure.

With the above method, the first terminal inputs the verification information into the displayed verification information input page after receiving the verification information synchronized with the second terminal, so that the intelligence and convenience of verification information input are improved, the user does not need to manually input the verification information, and the user experience is improved.

Figure 8:
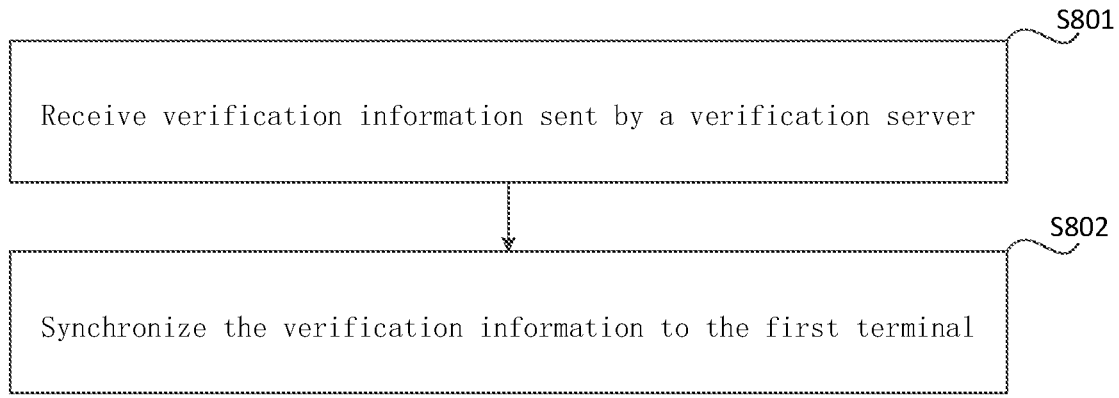
FIG. 8 is a flowchart of a method for inputting verification information according to an example.

FIG. 8 is a flowchart of a method for inputting verification information according to an example. As shown in FIG. 8, the method is performed by a second terminal, and includes the following steps:

In step S801, verification information sent by a verification server is received.

The verification information sent by the verification server may be received in the case that a first terminal sends a verification information request message to the verification server in response to a verification information request operation triggered by a user. In addition, the verification information may be generated by the verification server according to the verification information request message. For example, the verification information may be a short message, including the verification information, generated by the verification server.

In step S802, the verification information is synchronized to the first terminal.

The verification information is synchronized to the first terminal, such that the first terminal may input the verification information into a displayed verification information input page.

By adoption of the method, the second terminal receives the verification information sent by the verification server in the case of receiving the verification information request message sent by the first terminal to the verification server, and synchronizes the verification information to the first terminal, such that the first terminal can input the verification information into the displayed verification information input page. In this way, the intelligence and convenience of verification information input are improved, the user does not need to manually input the verification information, and the user experience is improved.

Figure 9:
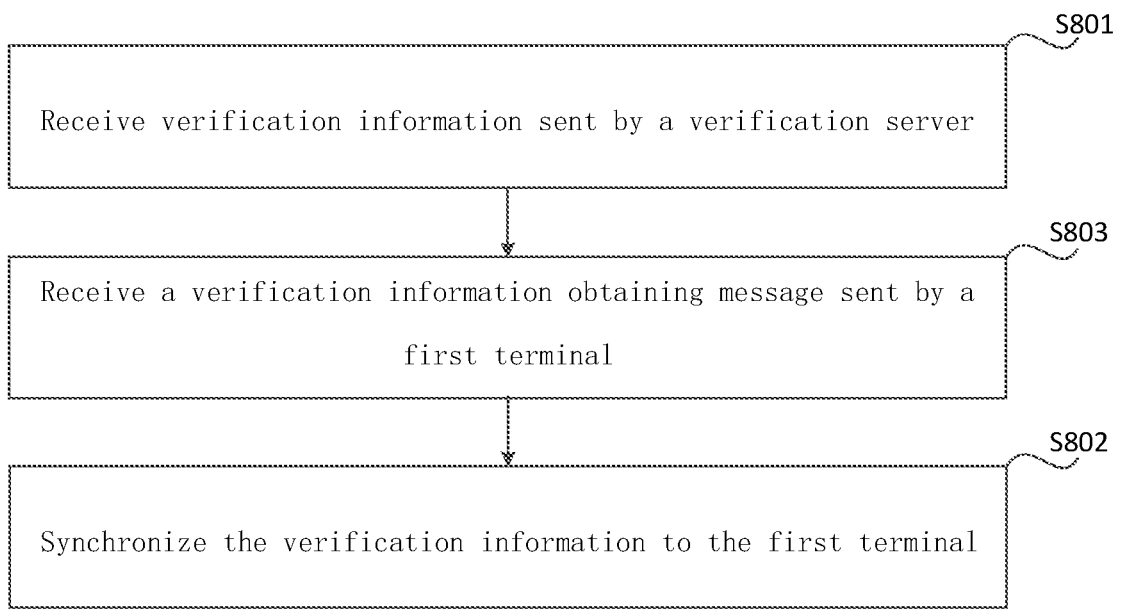
FIG. 9 is a flowchart of another method for inputting verification information according to an example.

FIG. 9 is a flowchart of yet another method for inputting verification information according to an example. As shown in FIG. 9, before step S802, the method further includes the following step:

In Step S803, a verification information obtaining message sent by the first terminal is received.

Correspondingly, synchronizing the verification information to the first terminal includes:

the verification information is synchronized to the first terminal in the case of receiving the verification information obtaining message.

Considering that there may be a situation where the second terminal is connected to a plurality of terminal devices at the same time, and at the same time, in order to further confirm a demand of the user, the verification information may be synchronized to the first terminal in the case of receiving the verification information obtaining message sent by the first terminal. The verification information can be accurately sent to a terminal device that requires the verification information in the case that the second terminal is connected to a plurality of terminal devices at the same time. At the same time, the verification information can be accurately sent to the first terminal after a use intention of the user is further determined, such that the user can perform further operations according to the verification information.

Figure 10:
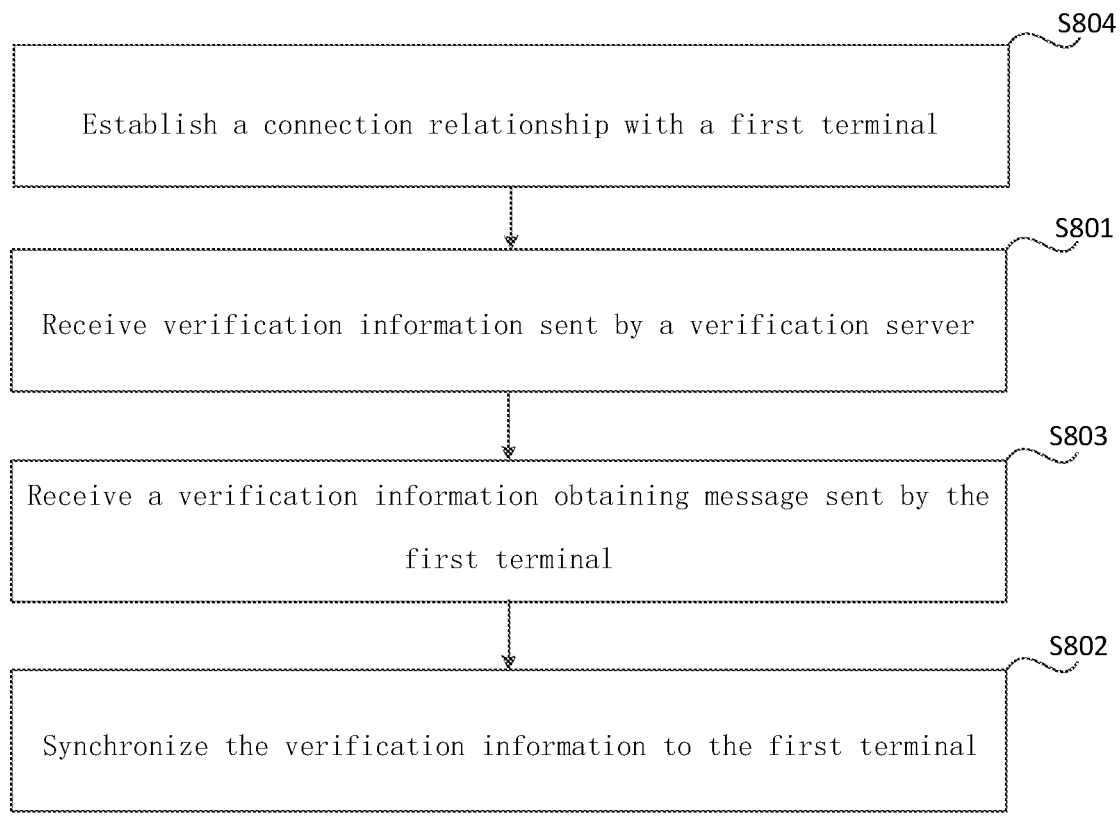
FIG. 10 is a flowchart of yet another method for inputting verification information according to an example.

FIG. 10 is a flowchart of yet another method for inputting verification information according to an example. As shown in FIG. 10, before step S801, the method may further include the following step:

In Step S804, a connection relationship with the first terminal is established.

Correspondingly, synchronizing the verification information to the first terminal includes:

in the case that the connection with the first terminal is established, the verification information is sent to the first terminal.

In the example of the disclosure, the connection relationship with the first terminal may be established in the following manners:

in the case that the first terminal logs in to the same user account as the second terminal, the connection relationship with the first terminal is established; or, a connection establishment request message sent by the first terminal is received, and the connection relationship with the second terminal is established according to the connection establishment request message.

For example, the connection establishment request message may be a request message initiated by the first terminal to the second terminal, and the second terminal requires to input the verification information provided by the first terminal side. The verification information may be a multi-digit number. After the second terminal inputs the verification information, the second terminal establishes the connection relationship with the first terminal. The connection establishment request message may also be that the first terminal scans a connection two-dimensional code of the second terminal side, so that the connection relationship between the first terminal and the second terminal is established.

The connection establishment request message may realize communication via a Wi-Fi protocol, a Bluetooth protocol, etc., which is not specifically limited by the disclosure.

By adoption of the method, the second terminal receives the verification information sent by the verification server in the case of receiving the verification information request message sent by the first terminal to the verification server, and synchronizes the verification information to the first terminal in the case of receiving the verification information obtaining message sent by the first terminal, such that the first terminal can input the verification information into the displayed verification information input page. In this way, the intelligence and convenience of verification information input are improved, a user does not need to manually input the verification information, and the user experience is improved.

Figure 11:
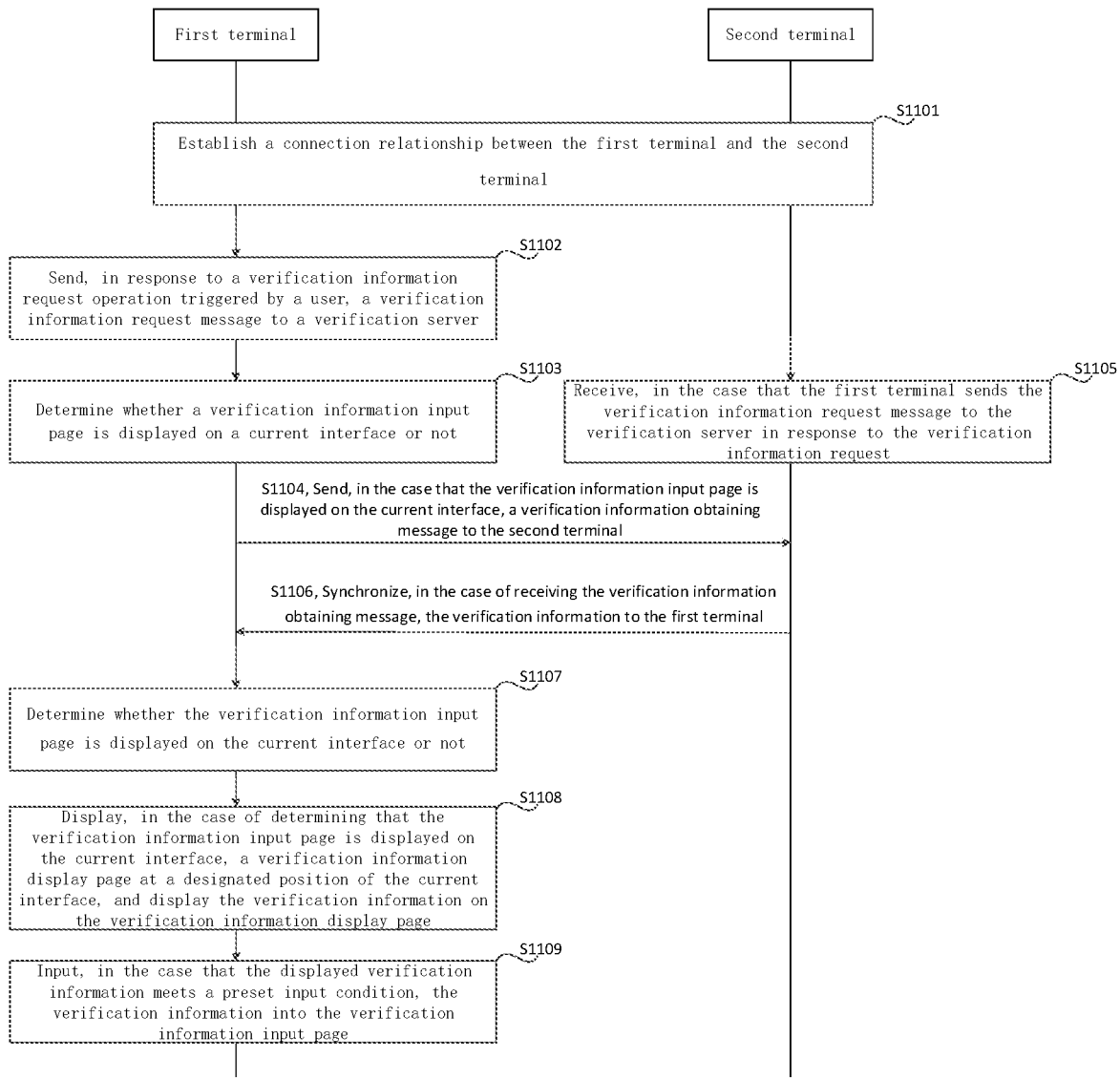
FIG. 11 is a flowchart of a method for inputting verification information according to an example.

FIG. 11 is a flowchart of a method for inputting verification information according to an example. As shown in FIG. 11, the method includes the following steps:

In Step S1101, a connection relationship between a first terminal and a second terminal is established.

The connection relationship established between the first terminal and the second terminal may be established via a connection request sent by the first terminal to the second terminal, or via a connection request sent by the second terminal to the first terminal.

In step S1102, in response to a verification information request operation triggered by a user, a verification information request message is sent to a verification server.

The verification information request message is sent by the first terminal to the verification server. The verification information request message includes user communication identifier information, such that the verification server may generate verification information according to the verification information request message, and send the verification information to the second terminal corresponding to the user communication identifier information.

In step S1103, whether a verification information input page is displayed on a current interface or not is determined.

In the case of determining that the verification information input page is displayed on the current interface, step S1104 is executed. In the case of determining that the verification information input page is not displayed on the current interface, it is determined that the user does not require to further input the verification information, and the verification information is not saved.

In step S1104, in the case that the verification information input page is displayed on the current interface, a verification information obtaining message is sent to the second terminal.

In step S1105, the verification information sent by the verification server is received in the case that the first terminal sends the verification information request message to the verification server in response to the verification information request operation triggered by the user.

In step S1106, the verification information is synchronized to the first terminal in the case of receiving the verification information obtaining message.

In step S1107, whether the verification information input page is displayed on the current interface is determined.

In the case of determining that the verification information input page is displayed on the current interface, step S1108 is executed. In the case of determining that the verification information input page is not displayed on the current interface, it may be determined that the user does not require to further input the verification information, and the verification information is not saved.

In step S1108, a verification information display page is displayed at a designated position of the current interface in the case of determining that the verification information input page is displayed on the current interface, and the verification information is displayed on the verification information display page.

In step S1109, in the case that the displayed verification information meets a preset input condition, the verification information is input into the verification information input page.

In the example of the disclosure, the preset input condition may include:

an information input operation of the user on the displayed verification information is obtained within a preset time period; or, the information input operation of the user on the displayed verification information is not obtained in the case that the preset time period is reached.

With the above method, the first terminal inputs the verification information into the displayed verification information input page after receiving the verification information synchronized with the second terminal, so that the intelligence and convenience of verification information input are improved, the user does not need to manually input the verification information, and the user experience is improved.

Figure 12:
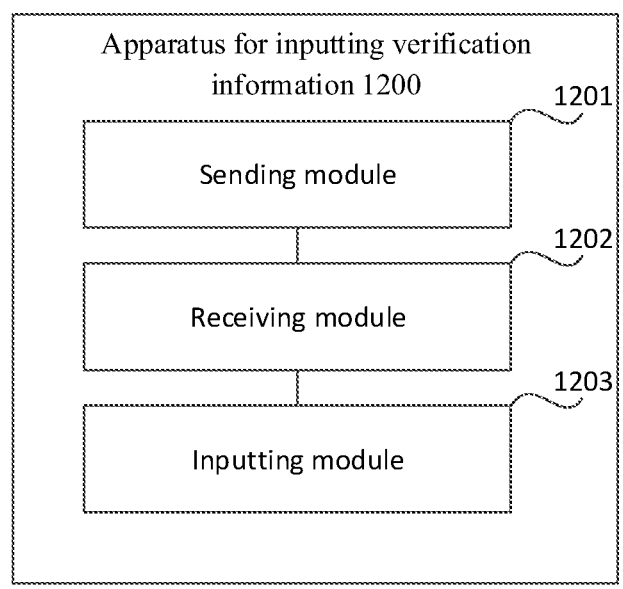
FIG. 12 is a block diagram of an apparatus for inputting verification information according to an example.

FIG. 12 is a block diagram of an apparatus for inputting verification information according to an example. As shown in FIG. 12, the apparatus 1200 is performed by a first terminal, and includes:

a sending module 1201, configured to send, in response to a verification information request operation triggered by a user, a verification information request message to a verification server, the verification information request message including user communication identifier information, such that the verification server may generate verification information according to the verification information request message, and send the verification information to a second terminal corresponding to the user communication identifier information;

a receiving module 1202, configured to receive the verification information synchronized with the second terminal; and an inputting module 1203, configured to input the verification information into a displayed verification information input page.

By adoption of the apparatus, the first terminal inputs the verification information into the displayed verification information input page after receiving the verification information synchronized with the second terminal, so that the intelligence and convenience of verification information input are improved, the user does not need to manually input the verification information, and the user experience is improved.

Figure 13:
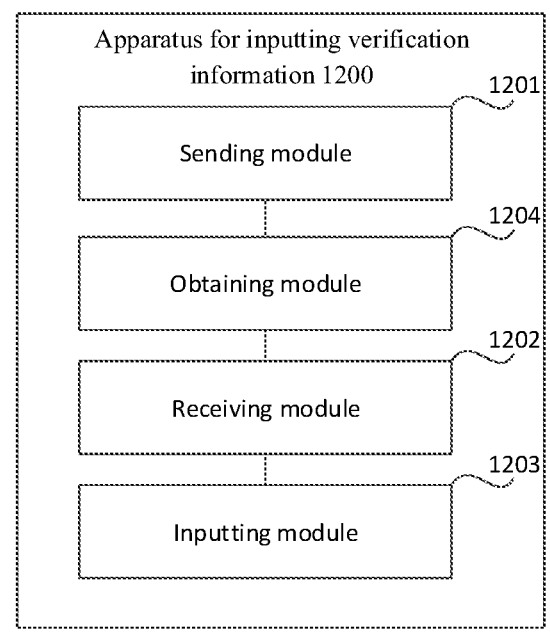
FIG. 13 is a block diagram of another apparatus for inputting verification information according to an example.

FIG. 13 is a block diagram of another apparatus for inputting verification information according to an example. As shown in FIG. 13, the apparatus 1200 further includes:

an obtaining module 1204, configured to send a verification information obtaining message to the second terminal.

The receiving module 1202 is configured to receive the verification information synchronized, in response to the verification information obtaining message, with the second terminal.

Figure 14:
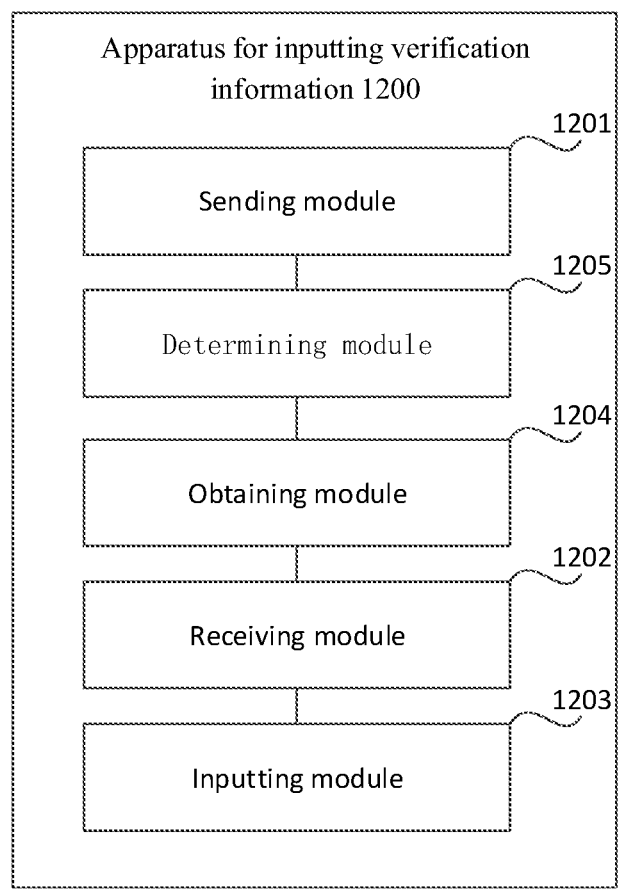
FIG. 14 is a block diagram of yet another apparatus for inputting verification information according to an example.

FIG. 14 is a block diagram of yet another apparatus for inputting verification information according to an example. As shown in FIG. 14, the apparatus 1200 further includes:

a determining module 1205, configured to determine whether the verification information input page is displayed on a current interface or not.

The obtaining module 1204 is configured to send, in the case that the verification information input page is displayed on the current interface, the verification information obtaining message to the second terminal.

In some examples, the inputting module 1203 is configured to input, in the case of determining that the verification information input page is displayed on the current interface, the verification information into the displayed verification information input page.

Figure 15:
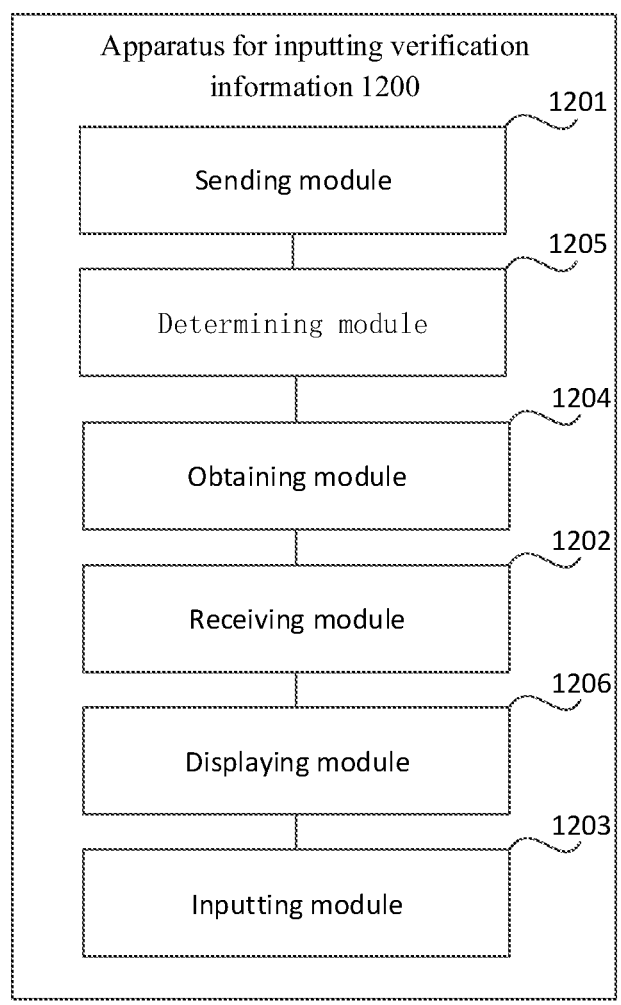
FIG. 15 is a block diagram of yet another apparatus for inputting verification information according to an example.

FIG. 15 is a block diagram of yet another apparatus for inputting verification information according to an example. As shown in FIG. 15, the apparatus 1200 further includes:

a displaying module 1206, configured to display a verification information display page at a designated position of the current interface, and display the verification information on the verification information display page.

The inputting module 1203 is configured to input, in the case that the displayed verification information meets a preset input condition, the verification information into the verification information input page.

In some examples, the preset input condition includes: an information input operation of the user on the displayed verification information is obtained within a preset time period; or, the information input operation of the user on the displayed verification information is not obtained in the case that the preset time period is reached.

Figure 16:
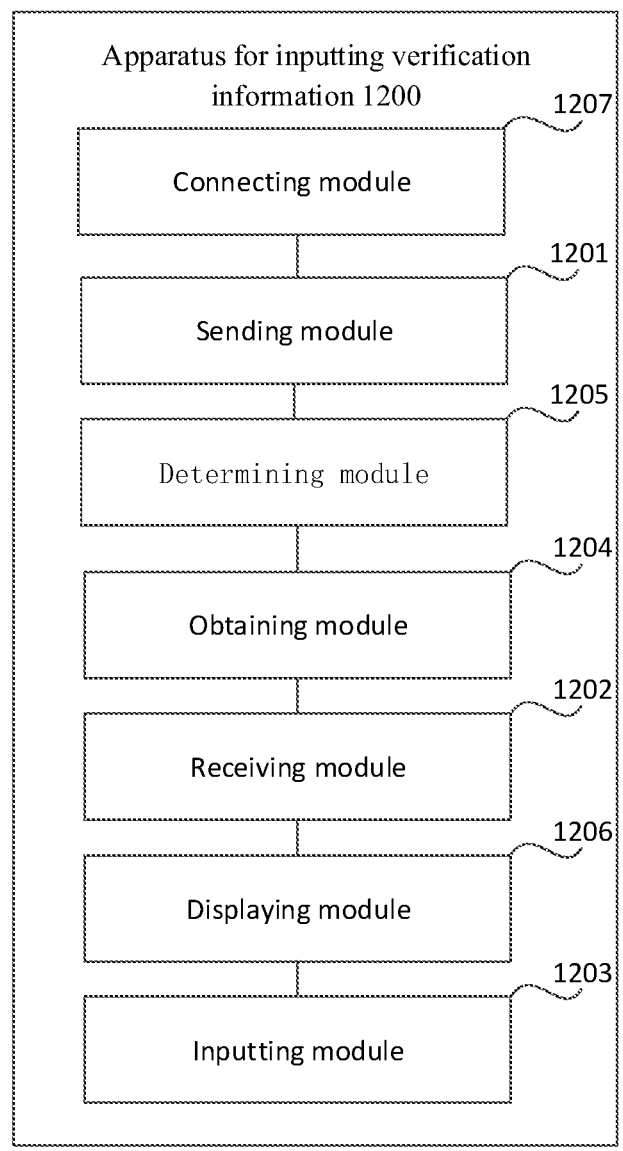
FIG. 16 is a block diagram of yet another apparatus for inputting verification information according to an example.

FIG. 16 is a block diagram of yet another apparatus for inputting verification information according to an example. As shown in FIG. 16, the apparatus 1200 further includes:

a connecting module 1207, configured to establish a connection relationship with the second terminal.

The receiving module 1202 is configured to receive, in the case that the connection with the second terminal is established, the verification information synchronized with the second terminal.

In some examples, the connecting module 1207 is configured to: establish, in the case that the second terminal logs in to the same user account as the first terminal, the connection relationship with the second terminal; or, receive a connection establishment request message sent by the second terminal, and establish the connection relationship with the second terminal according to the connection establishment request message.

By adoption of the apparatus, the first terminal inputs the verification information into the displayed verification information input page after receiving the verification information synchronized with the second terminal, so that the intelligence and convenience of verification information input are improved, the user does not need to manually input the verification information, and the user experience is improved.

Figure 17:
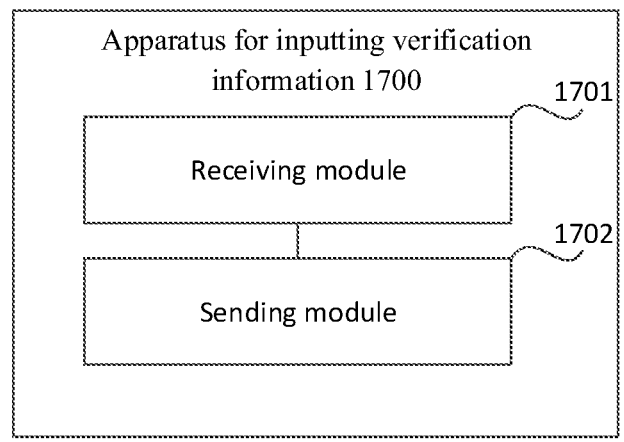
FIG. 17 is a block diagram of an apparatus for inputting verification information according to an example.

FIG. 17 is a block diagram of an apparatus for inputting verification information according to an example. As shown in FIG. 17, the apparatus 1700 is performed by a second terminal, and includes:

a receiving module 1701, configured to receive verification information sent by a verification server, the verification information being generated by the verification server according to a verification information request message; and a sending module 1702, configured to synchronize the verification information to a first terminal, such that the first terminal inputs the verification information into a displayed verification information input page.

In some examples, the sending module 1702 is configured to send, in the case that a verification information obtaining message is received, the verification information to the first terminal.

Figure 18:
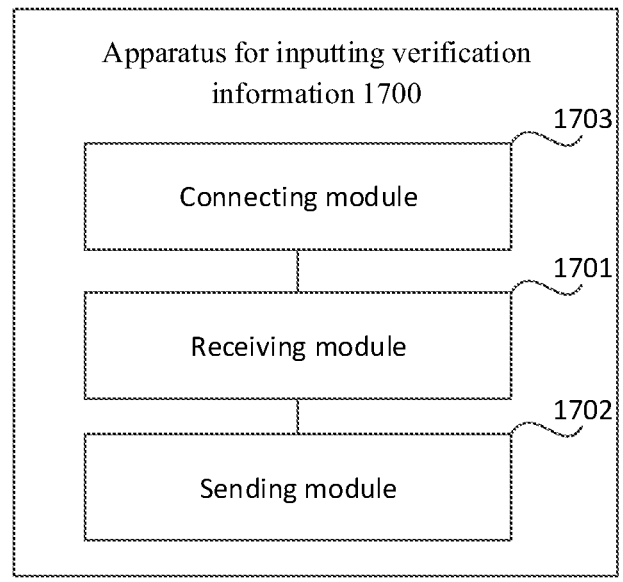
FIG. 18 is a block diagram of another apparatus for inputting verification information according to an example.

FIG. 18 is a block diagram of yet another apparatus for inputting verification information according to an example. As shown in FIG. 18, the apparatus 1700 further includes:

a connecting module 1703, configured to establish a connection relationship with the first terminal. The sending module is configured to synchronize, in the case that the connection with the first terminal is established, the verification information to the first terminal.

In some examples, the connecting module 1703 is configured to: establish, in the case that the first terminal logs in to the same user account as the second terminal, the connection relationship with the first terminal; or, receive a connection establishment request message sent by the first terminal, and establish the connection relationship with the first terminal according to the connection establishment request message.

By adoption of the apparatus, the second terminal receives the verification information sent by the verification server in the case of receiving the verification information request message sent by the first terminal to the verification server, and synchronizes the verification information to the first terminal in the case of receiving the verification information obtaining message sent by the first terminal, such that the first terminal can input the verification information into the displayed verification information input page. In this way, the intelligence and convenience of verification information input are improved, the user does not need to manually input the verification information, and the user experience is improved.

As for the apparatus in the above example, the specific manner in which each module performs operations has been described in detail in the method example, and detailed description will not be given here.

The disclosure further provides a computer-readable storage medium which stores computer program instructions. The program instructions, when executed by a processor, implement the steps of the method for inputting verification information provided by the disclosure.

Figure 19:
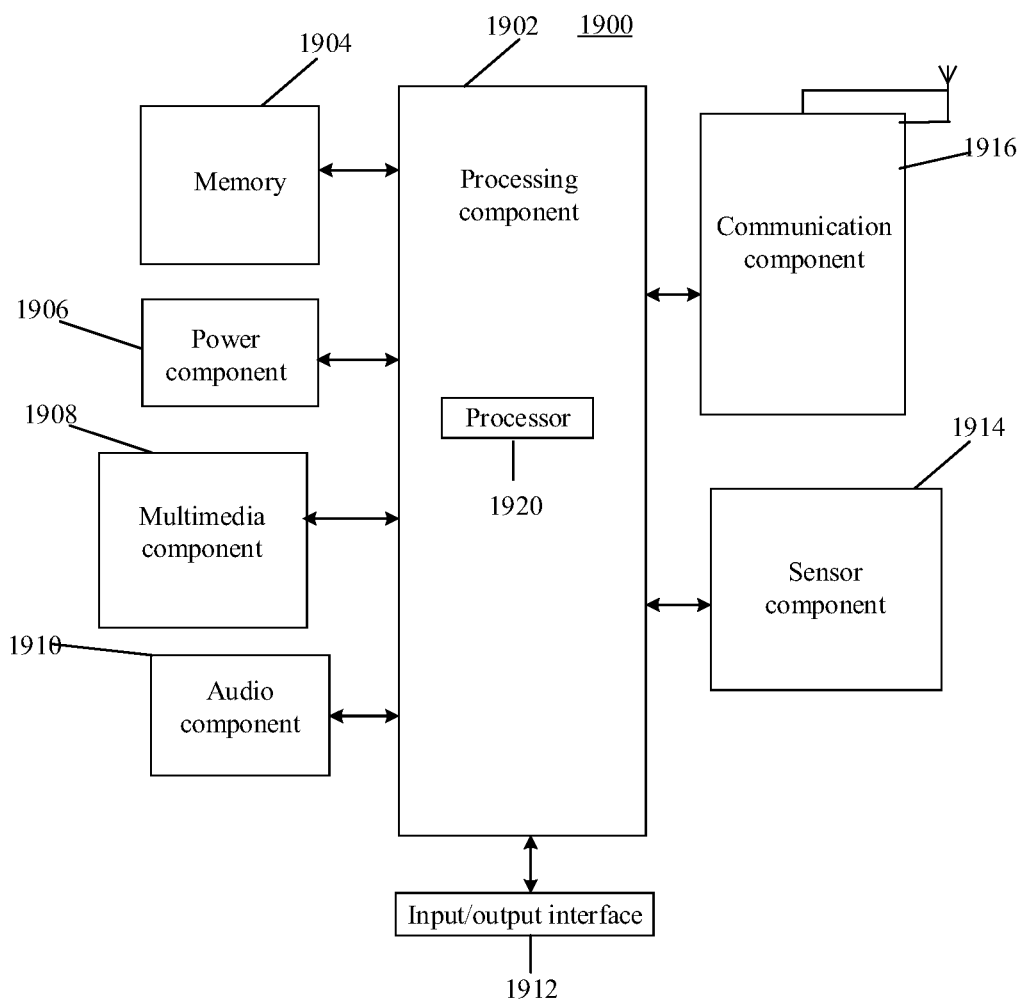
FIG. 19 is a block diagram of an apparatus for inputting verification information according to an example.

FIG. 19 is a block diagram of an apparatus 1900 for inputting verification information according to an example. For example, the apparatus 1900 may be a mobile phone, a computer, a digital broadcasting terminal, a messaging device, a game console, a tablet device, a medical device, a fitness device, a personal digital assistant, etc.

Referring to FIG. 19, the apparatus 1900 may include one or more of the following components: a processing component 1902, a memory 1904, a power component 1906, a multimedia component 1908, an audio component 1910, an input/output (I/O) interface 1912, a sensor component 1914, and a communication component 1916.

The processing component 1902 typically controls the overall operation of the apparatus 1900, such as operations associated with display, telephone call, data communication, camera operations, and recording operations. The processing component 1902 may include one or more processors 1920 to execute instructions to complete all or part of the steps of the above method for inputting verification information. In addition, the processing component 1902 may include one or more modules to facilitate interaction between the processing component 1902 and other components. For example, the processing component 1902 may include a multimedia module to facilitate interaction between the multimedia component 1908 and the processing component 1902.

The memory 1904 is configured to store various types of data to support operations at the apparatus 1900. Examples of these data include instructions for any application or method operating on the apparatus 1900, contact data, phonebook data, messages, pictures, videos, etc. The memory 1904 may be implemented by any type of volatile or nonvolatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or a compact disk.

The power component 1906 provides power for various components of the apparatus 1900. The power component 1906 may include a power management system, one or more power sources and other components associated with generating, managing and distributing power for the apparatus 1900.

The multimedia component 1908 includes a screen providing an output interface between the apparatus 1900 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding operation, but also detect the duration and pressure related to the touch or sliding operation. In some examples, the multimedia component 1908 includes a front camera and/or a rear camera. When the apparatus 1900 is in an operation mode, such as a shooting mode or a video mode, the front camera and/or the rear camera can receive external multimedia data. Each front camera and rear camera can be a fixed optical lens system or have a focal length and optical zoom capability.

The audio component 1910 is configured to output and/or input audio signals. For example, the audio component 1910 includes a microphone (MIC) configured to receive an external audio signal when the apparatus 1900 is in the operation mode, such as a call mode, a recording mode, and a speech recognition mode. The received audio signal may be further stored in the memory 1904 or transmitted via the communication component 1916. In some examples, the audio component 1910 also includes a speaker for outputting an audio signal.

The I/O interface 1912 provides an interface between the processing component 1902 and a peripheral interface module which can be a keyboard, a click wheel, a button, etc. These buttons may include but are not limited to: a home button, volume buttons, a start button and a lock button.

The sensor component 1914 includes one or more sensors for providing state evaluation of various aspects of the apparatus 1900. For example, the sensor component 1914 may detect an on/off state of the apparatus 1900 and the relative positioning of the components, for example, the component is a display and a keypad of the apparatus 1900. The sensor component 1914 may also detect the change of the position of the apparatus 1900 or one component of the apparatus 1900, the presence or absence of user contact with the apparatus 1900, the azimuth or acceleration/deceleration of the apparatus 1900, and temperature change of the apparatus 1900. The sensor component 1914 may include a proximity sensor configured to detect the presence of nearby objects without any physical contact. The sensor component 1914 may further include an optical sensor, such as a CMOS or CCD image sensor, for use in imaging applications. In some examples, the sensor component 1914 may further include an acceleration sensor, a gyroscope sensor, a magnetic sensor, a pressure sensor, or a temperature sensor.

The communication component 1916 is configured to facilitate wired or wireless communication between the apparatus 1900 and other devices. The apparatus 1900 may access a wireless network based on a communication standard, such as WiFi, 2G or 3G, or their combination. In an example, the communication component 1916 receives a broadcast signal or broadcast-related information from an external broadcast management system via a broadcast channel. In an example, the communication component 1916 further includes a near field communication (NFC) module to facilitate short-range communication. For example, the NFC module may be implemented based on the radio frequency identification (RFID) technology, the infrared data association (IrDA) technology, the ultrawideband (UWB) technology, the Bluetooth (BT) technology and other technologies.

In an example, the apparatus 1900 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above method for inputting verification information.

In an example, a non-temporary computer-readable storage medium including instructions, such as the memory 1904 including instructions, is further provided. The instructions may be executed by the processor 1920 of the apparatus 1900 to complete the above method for inputting verification information. For example, the non-temporary computer-readable storage medium may be a ROM, a random access memory (RAM), a CD-ROM, a magnetic tape, a floppy disk, an optical data storage device, etc.

In another example, a computer program product is further provided. The computer program product includes a computer program executable by a programmable apparatus. The computer program has a code part which is configured to execute, when executed by the programmable apparatus, the above method for inputting verification information.

Other implementations of the disclosure will be apparent to those skilled in the art from consideration of the specification and practice of the disclosure herein. The disclosure is intended to cover any variations, uses, or adaptations of the disclosure following the general principles of the disclosure and including such departures from the disclosure as come within known or customary practice in the art. The specification and examples are considered as examples only, with a true scope and spirit of the disclosure being indicated by the following claims.

It is to be understood that the disclosure is not limited to the exact construction that has been described above and illustrated in the accompanying drawings, and that various modifications and changes may be made without departing from the scope of the disclosure. The scope of the disclosure is merely limited by the appended claims.

According to a first aspect of examples of the disclosure, a method for inputting verification information is provided. The method is performed by a first terminal, and includes: sending, in response to a verification information request operation triggered by a user, a verification information request message to a verification server, where the verification information request message includes user communication identifier information, such that the verification server may generate verification information according to the verification information request message, and send the verification information to a second terminal corresponding to the user communication identifier information; receiving the verification information synchronized with the second terminal; and inputting the verification information into a displayed verification information input page.

In some examples, the method further includes: sending a verification information obtaining message to the second terminal. Receiving the verification information synchronized with the second terminal includes: receiving the verification information synchronized, in response to the verification information obtaining message, with the second terminal.

In some examples, the method further includes: determining whether the verification information input page is displayed on a current interface or not. Sending the verification information obtaining message to the second terminal includes: sending, in the case that the verification information input page is displayed on the current interface, the verification information obtaining message to the second terminal.

In some examples, inputting the verification information into the displayed verification information input page includes: inputting, in the case of determining that the verification information input page is displayed on the current interface, the verification information into the displayed verification information input page.

In some examples, the method further includes: displaying a verification information display page at a designated position of the current interface, and displaying the verification information on the verification information display page. Inputting the verification information into the displayed verification information input page includes: inputting, in the case that the displayed verification information meets a preset input condition, the verification information into the verification information input page.

In some examples, the preset input condition includes: an information input operation of the user on the displayed verification information is obtained within a preset time period; or, the information input operation of the user on the displayed verification information is not obtained in the case that the preset time period is reached.

In some examples, the method further includes: establishing a connection relationship with the second terminal. Receiving the verification information synchronized with the second terminal includes: receiving, in the case that the connection with the second terminal is established, the verification information synchronized with the second terminal.

In some examples, establishing the connection relationship with the second terminal includes: establishing, in the case that the second terminal logs in to the same user account as the first terminal, the connection relationship with the second terminal; or, receiving a connection establishment request message sent by the second terminal, and establishing the connection relationship with the second terminal according to the connection establishment request message.

According to a second aspect of examples of the disclosure, a method for inputting verification information is provided. The method is performed by a second terminal, and includes: receiving verification information sent by a verification server, the verification information being generated by the verification server according to a verification information request message; and synchronizing the verification information to a first terminal, such that the first terminal inputs the verification information into a displayed verification information input page.

In some examples, synchronizing the verification information to the first terminal includes: synchronizing, in the case that a verification information obtaining message is received, the verification information to the first terminal.

In some examples, the method further includes: establishing a connection relationship with the first terminal. Synchronizing the verification information to the first terminal includes: synchronizing, in the case that the connection with the first terminal is established, the verification information to the first terminal.

In some examples, establishing the connection relationship with the first terminal includes: establishing, in the case that the first terminal logs in to the same user account as the second terminal, the connection relationship with the first terminal; or, receiving a connection establishment request message sent by the first terminal, and establishing the connection relationship with the first terminal according to the connection establishment request message.

According to a third aspect of examples of the disclosure, an apparatus for inputting verification information is provided. The apparatus is performed by a first terminal, and includes: a sending module, configured to send, in response to a verification information request operation triggered by a user, a verification information request message to a verification server, where the verification information request message includes user communication identifier information, such that the verification server may generate verification information according to the verification information request message, and send the verification information to a second terminal corresponding to the user communication identifier information; a receiving module, configured to receive the verification information synchronized with the second terminal; and an inputting module, configured to input the verification information into a displayed verification information input page.

In some examples, the apparatus further includes: an obtaining module, configured to send a verification information obtaining message to the second terminal. The receiving module is configured to receive the verification information synchronized, in response to the verification information obtaining message, with the second terminal.

In some examples, the apparatus further includes: a determining module, configured to determine whether the verification information input page is displayed on a current interface or not. The obtaining module is configured to send, in the case that the verification information input page is displayed on the current interface, the verification information obtaining message to the second terminal.

In some examples, the inputting module is configured to input, in the case of determining that the verification information input page is displayed on the current interface, the verification information into the displayed verification information input page.

In some examples, the apparatus further includes: a displaying module, configured to display a verification information display page at a designated position of the current interface, and display the verification information on the verification information display page. The inputting module is configured to input, in the case that the displayed verification information meets a preset input condition, the verification information into the verification information input page.

In some examples, the preset input condition includes: an information input operation of the user on the displayed verification information is obtained within a preset time period; or, the information input operation of the user on the displayed verification information is not obtained in the case that the preset time period is reached.

In some examples, the apparatus further includes: a connecting module, configured to establish a connection relationship with the second terminal. The receiving module is configured to receive, in the case that the connection with the second terminal is established, the verification information synchronized with the second terminal.

In some examples, the connecting module is configured to: establish, in the case that the second terminal logs in to the same user account as the first terminal, the connection relationship with the second terminal; or, receive a connection establishment request message sent by the second terminal, and establish the connection relationship with the second terminal according to the connection establishment request message.

According to a fourth aspect of examples of the disclosure, an apparatus for inputting verification information is provided. The apparatus is performed by a second terminal, and includes: a receiving module, configured to receive verification information sent by a verification server, the verification information being generated by the verification server according to a verification information request message; and a sending module, configured to synchronize the verification information to a first terminal, such that the first terminal inputs the verification information into a displayed verification information input page.

In some examples, the sending module is configured to synchronize, in the case that a verification information obtaining message is received, the verification information to the first terminal.

In some examples, the apparatus further includes: a connecting module, configured to establish a connection relationship with the first terminal. The sending module is configured to synchronize, in the case that the connection with the first terminal is established, the verification information to the first terminal.

In some examples, the connecting module is configured to: establish, in the case that the first terminal logs in to the same user account as the second terminal, the connection relationship with the first terminal; or, receive a connection establishment request message sent by the first terminal, and establish the connection relationship with the first terminal according to the connection establishment request message.

The technical solution provided by the examples of the disclosure may include the following beneficial effects:

the first terminal sends, in response to the verification information request operation triggered by the user, the verification information request message to the verification server, and the verification information request message includes the user communication identifier information, such that the verification server can generate the verification information according to the verification information request message, and send the verification information to the second terminal corresponding to the user communication identifier information. The first terminal inputs the verification information into the displayed verification information input page after receiving the verification information synchronized with the second terminal. In the disclosure, as the first terminal inputs the verification information into the displayed verification information input page after receiving the verification information synchronized with the second terminal, the intelligence and convenience of verification information input are improved, the user does not need to manually input the verification information, and the user experience is improved.

What is claimed is:

1. A method for inputting verification information, performed by a first terminal, and comprising:
sending, in response to a verification information request operation triggered by a user, a verification information request message to a verification server, wherein the verification information request message comprises user communication identifier information, and the verification information request message is configured to indicate the verification server to generate verification information according to the verification information request message and send the verification information to a second terminal corresponding to the user communication identifier information;
sending a verification information obtaining message to the second terminal, wherein the verification information obtaining message is configured to send an obtaining request to the second terminal to enable the second terminal to synchronize the verification information to the first terminal according to the verification information obtaining message, wherein the verification information obtaining message comprises device information of the first terminal;
receiving the verification information synchronized by the second terminal according to the device information of the first terminal; and
inputting the verification information into a displayed verification information input page.

2. The method according to claim 1, further comprising:
determining whether the verification information input page is displayed on a current interface or not,
wherein sending the verification information obtaining message to the second terminal comprises:
sending, in the case that the verification information input page is displayed on the current interface, the verification information obtaining message to the second terminal.

3. The method according to claim 2, wherein inputting the verification information into the displayed verification information input page comprises:
inputting, in the case of determining that the verification information input page is displayed on the current interface, the verification information into the displayed verification information input page.

4. The method according to claim 1, further comprising:
displaying a verification information display page at a designated position of the current interface, and displaying the verification information on the verification information display page,
wherein inputting the verification information into the displayed verification information input page comprises:
inputting, in the case that the displayed verification information meets a preset input condition, the verification information into the verification information input page.

5. The method according to claim 4, wherein the preset input condition comprises:
an information input operation of the user on the displayed verification information is obtained within a preset time period.

6. The method according to claim 4, wherein the preset input condition comprises:
an information input operation of the user on the displayed verification information is not obtained in the case that a preset time period is reached.

7. The method according to claim 1, further comprising:
establishing a connection relationship with the second terminal,
wherein receiving the verification information synchronized with the second terminal comprises:
receiving, in the case that the connection with the second terminal is established, the verification information synchronized with the second terminal.

8. The method according to claim 7, wherein establishing the connection relationship with the second terminal comprises:
establishing, in the case that the second terminal logs in to the same user account as the first terminal, the connection relationship with the second terminal.

9. The method according to claim 7, wherein establishing the connection relationship with the second terminal comprises:
receiving a connection establishment request message sent by the second terminal, and establishing the connection relationship with the second terminal according to the connection establishment request message.

10. A non-transitory computer-readable storage medium, storing computer program instructions thereon, wherein the program instructions, when executed by a processor, implement the steps of the method according to claim 1.

11. A method for inputting verification information, performed by a second terminal, and comprising:
receiving verification information sent by a verification server, wherein the verification information is generated by the verification server according to a verification information request message sent by a first terminal;
receiving a verification information obtaining message sent by the first terminal, wherein the verification information obtaining message is configured to send an obtaining request to the second terminal, and the verification information obtaining message comprises device information of the first terminal; and
synchronizing the verification information to the first terminal according to the device information of the first terminal, to enable the first terminal to inputs the verification information into a displayed verification information input page.

12. The method according to claim 11, further comprising:
establishing a connection relationship with the first terminal,
wherein synchronizing the verification information to the first terminal comprises:
synchronizing, in the case that the connection with the first terminal is established, the verification information to the first terminal.

13. The method according to claim 12, wherein establishing the connection relationship with the first terminal comprises:
establishing, in the case that the first terminal logs in to the same user account as the second terminal, the connection relationship with the first terminal.

14. The method according to claim 12, wherein establishing the connection relationship with the first terminal comprises:
receiving a connection establishment request message sent by the first terminal, and establishing the connection relationship with the first terminal according to the connection establishment request message.

15. An apparatus for inputting verification information, applied to a second terminal, and comprising:
a processor; and
a memory configured to store processor-executable instructions, wherein
the processor is configured to implement the steps of the method according to claim 11.

16. A non-transitory computer-readable storage medium, storing computer program instructions thereon, wherein the program instructions, when executed by a processor, implement the steps of the method according to claim 11.

17. An apparatus for inputting verification information, applied to a first terminal, and comprising:
a processor; and
a memory configured to store processor-executable instructions, wherein the processor is configured to:
send, in response to a verification information request operation triggered by a user, a verification information request message to a verification server, wherein the verification information request message comprises user communication identifier information, and the verification information request message is configured to indicate the verification server to generate the verification information according to the verification information request message, and send the verification information to a second terminal corresponding to the user communication identifier information;

send a verification information obtaining message to the second terminal, wherein the verification information obtaining message is configured to send an obtaining request to the second terminal to enable the second terminal to synchronize the verification information to the first terminal according to the verification information obtaining message, wherein the verification information obtaining message comprises device information of the first terminal;

receive the verification information synchronized by the second terminal according to the device information of the first terminal; and input the verification information into a displayed verification information input page.

* * * * *